United States Patent Office 3,737,519
Patented June 5, 1973

3,737,519
PROCESS OF RECOVERING WATER-FREE
HYDROGEN PEROXIDE SOLUTIONS
Gerd Schreyer and Ferdinand Theissen, Grossauheim,
Otto Weiberg, Neu-Isenburg, and Wolfgang Weigert,
Offenbach am Main, Germany, assignors to Deutsche
Gold- und Silber-Scheideanstalt vormals Roessler,
Frankfurt am Main, Germany
No Drawing. Filed May 21, 1971, Ser. No. 145,078
Claims priority, application Germany, May 23, 1970,
P 20 25 237.3
Int. Cl. C01b 15/02
U.S. Cl. 423—589                           14 Claims

ABSTRACT OF THE DISCLOSURE

Process for preparing water-free hydrogen peroxide solutions from hydrogen peroxide containing working solutions which have been obtained in the preparation of hydrogen peroxide by the anthraquinone process which comprises passing the peroxide containing working solution in co- or countercurrent flow relationship to an organic solvent which is chemically stable and which is either introduced in the form of a vapor or which is converted into a vapor in situ in a film-forming evaporator whereby the hydrogen peroxide is desorbed into the solvent and thereafter recovering the hydrogen peroxide solutions in the form of a condensate.

---

This invention relates to an improved process for recovering water-free hydrogen peroxide from the reaction solutions obtained in the manufacture of hydrogen peroxide according to the anthraquinone process.

It has been proposed to recover water-free hydrogen peroxide solutions directly from the peroxide containing working solutions obtained in the manufacture of peroxide by the anthraquinone process which known processes involve a stripping distillation under reduced pressure. In the manufacture of hydrogen peroxide according to the anthraquinone procedure there is used a solution of one or more alkylanthraquinones in a high boiling solvent stable with respect to oxygen and the peroxide. As alkylanthraquinones there are used, for instance, 2-ethyl-, 2-butyl-, 2-isopropyl-, 2-amyl-anthraquinone and their partially nuclear hydrogenated derivatives as well as mixtures thereof and also esters of anthraquinone carboxylic acids.

In general as solvent for the above reaction there can be used aromatics having one or more rings which can also be substituted such as, for instance, alkylbenzene, alkylated or partially hydrogenated naphthalene or gasoline, aliphatic, cycloaliphatic or aromatic alcohols as well as their esters with straight chain fatty acids or phosphoric acid esters.

The working solutions are hydrogenated using hydrogenation contact catalysts such as palladium black, palladium carrier catalyst or Raney nickel whereby a greater or lesser part of the anthraquinone is converted into the corresponding hydroquinone. After separating off the hydrogenation catalyst, air, oxygen or air enriched with oxygen is introduced into the working solution containing the hydroquinone. As a result, anthrahydroquinone is reoxidized to anthraquinone and simultaneously hydrogen peroxide is formed. The hydrogen peroxide which is present in the working solution is then introduced into a column where it is passed in countercurrent flow relationship to organic vapors which dissolve the hydrogen peroxide and which under the processing conditions are not attacked by hydrogen peroxide. If the working solution introduced into the circulation has a reduced content of hydrogen peroxide then correspondingly larger dimensioned columns are required. Using the process and column as described the disadvantage arises that due to the setting in of an evaporation equilibrium and because of the relatively low desorption temperature the undesirably high hydrogen peroxide concentrations occur and further that part of the hydrogen peroxide reaches the column sump from which it is driven out only by the application of higher sump temperatures. The higher sump temperatures and the presence of the hydrogen peroxide therein result in an unnecessary stress on the working solution with attendant disadvantages.

It has now been found in accordance with the invention that water-free solutions of hydrogen peroxide in organic solvents can be recovered with reduced expenditures and under preservation of the working solution if the hydrogen peroxide containing working solution with or without preheating is passed in co- or countercurrent flow relationship to the vapors of an organic solvent which is chemically stable and which are introduced directly as vapors or produced in situ during the contacting of the hydrogen peroxide working solution with the solvent, in a film-forming evaporator maintained under vacuum and condensing the vapors following the evaporation step. It has been found advantageous in accordance with the invention to subject the vapors after they leave the evaporator to a condensation either by direct evaporation cooling with the liquid form of the solvent or by heat exchange. In case it is necessary a partial condensation may be interposed. It has also been found advantageous if the vapors leaving the evaporator are prior to the final condensation introduced into an intermediate column.

There is obtained in this manner not only substantially quantitative desorption of the hydrogen peroxide but also substantially quantitative yields of hydrogen peroxide calculated on the charged hydrogen peroxide.

As film-forming evaporator, there is preferably selected a thin layer forming film, rotary or centrifugal or gravity flow evaporator which can be operated to achieve co- or countercurrent flow relationship of the materials treated therein, the countercurrent type of flow being preferred.

The organic solvent vapors serve on the one hand to support the desorption and on the other to desensitize the hydrogen peroxide vapors. Therefore there can be used in the process of the invention conditions wherein the solvent and working solution are separately introduced and as well in contrast to the known process there can be used mixtures of the working solution and solvent formed just prior to the delivery thereof into the evaporator. This is particularly desirable if the boiling point of the solvent is only slightly, that is, just a few degrees under or over the boiling point of the peroxide. In this case there results a simultaneous vaporization of the hydrogen peroxide and the solvent ensuring a satisfactory desensitization of the vapor phase.

As solvent there can be suitably used all organic liquid solvents in which the hydrogen peroxide is soluble and which at atmospheric pressure boil in the range of about 30–180° C. and preferably in the range of about 95–175° C. The solvents can be used singly or in any possible mixture thereof. If the solvents used in the mixture have a boiling point of more than 30° or less than 15° C. higher than that of the hydrogen peroxide it is recommended that the solvent first be admixed with a higher or lower boiling component. The mixing ratio to be used in that case can lie between 10:1 and 1:10. Illustrative of the suitable solvents are the following: carboxylic acids, their esters with mono- and polyhydric alcohols, alcohols, ketones and ethers. As carboxylic acids there can be advantageously used formic acid, acetic acid, propionic acid, n- and isobutyric acid, trimethylacetic acid and fluoroacetic acid. Examples of suitable ester solvents include ethylacetate, propylacetate, butylacetate, amylacetate, cyclohexylacetate, n-hexylacetate, methylpropionate as well as all other esters which boil in the desired boiling range. There are also suitable for use as solvents in the process of the invention the unsaturated esters as for example allylacetate. Esters of fatty acids having alpha-positioned tertiary carbon atoms of the formula ($R^1$, $R^2$, $R^3$)—C—COOH in which $R^1$ is alkyl having 1–3 carbon atoms and $R^2$ and $R^3$ are each alkyl having 1–2 carbon atoms have been found to constitute particularly advantageous solvents. These fatty acids are esterified with aliphatic alcohols preferably methylalcohol-butyl-alcohol. Instances of especially preferred solvents are the methyl-butyl esters of trimethylacetic acid. The desorbing can also be most advantageously carried out with alcohols as desorbing agent. Examples of suitable alcohols include propanol, butanol, amylol, hexanol and cyclohexanol. Further it has been found that there can be used as the desorbing agent mixtures of carboxylic acids, esters or alcohols with hydrocarbons or hydrocarbon mixtures. In addition for the desorption of the hydrogen peroxide there may be used aliphatic ethers having 4–10 carbon atoms such as diethylether, dipropylether, diisopropylether, dibutylether, diisobutylether, di-sec. butylether, diamylether, diisoamylether, propylether or propylbutylether, dimethylether of ethylene or propylene glycol. Aliphatic ketones having 3–7 carbon atoms such as for example acetone, methylethylketone, methylisobutylketone and cyclohexanone have been found to be very suitable as desorbing agent. In the process of the invention, the ethers or the ketones can advantageously be used in the form of their mixtures with a hydrocarbon or with mixtures of hydrocarbons. In addition to the already named mixtures, all further combinations of the mentioned substances or groups of substances meeting the requirements above set forth can be used for stripping the hydrogen peroxide. Examples of such mixtures include the following:

acetic acid/di-n-propylether
acetic acid/methylethylethyleneglycolether
di-i-propylether/t-butylacetate
di-i-propylether/t-butylacetate/benzene
acetic acid/n-butylacetate
acetone/benzene
propionic acid/propylpropionate
propylacetate/acetic acid
propylacetate/propanol The mixing ratious used can be varied over very wide ranges, i.e., from using the pure substances to mixtures involving all possible mixing ranges. In most cases however mixing ratios should be selected with a view to safety factors and for ensuring that the mixtures used as desorbing substances will entirely dissolve the desorbed hydrogen peroxide so that two phases are not formed which would result in hydrogen peroxide containing mixtures having explosive properties. Such a phase separation in the condensate is to be expected where there have been used large amounts of the hydrocarbons in forming the desorbing mixture. Therefore in using mixtures with hydrocarbons the other solvent components should be present in an amount of at least 20 weight percent. In each case it is recommended that a preheating of the working solution to be desorbed be carried out as then the evaporation can be conducted utilizing much smaller working surfaces.

In case it is necessary in order to drive off any entrained portions of the working solution, a short column of relatively small cross-section can be used following the evaporator. This column has dimensions much below those used in the above-described earlier process because only the desorbed hydrogen peroxide and the desorption agent are delivered to the column and therefore smaller apparatus, reduced costs and increased efficiency in the processing are realized. Therefore in accordance with the invention it is sufficient to provide a column having 0.2–5 theoretical plates.

Because of the explosive tendencies of higher concentrations of peroxide solutions and vapors, specific steps are necessary to avoid the development of such explosive concentrations in the column located following the evaporator. Such special measures include the installation of a heat exchanger between the film-forming evaporator and the fractionating column which heat exchanger serves for cooling down the rising vapors delivered from the evaporator. By this means substantially the entire quantity of the entrained working solution is fractionated out without the greater part of the hydrogen peroxide being first condensed.

A similar fractionation effect can be realized through the procedure of spraying cold liquid desorption agent into the vapors rising out of the evaporator because of the evaporation cooling effect. The amount to be used can be determined without any difficulty and basically is that amount which is required to obtain the desired cooling effect and with which the total amount of solvent introduced will be evaporated.

Because of the very great differences between the evaporation heat and the specific heat of the organic vapors the amount of solvent used by way of comparison is small and can be almost entirely adjusted by decreasing the amount of desorbing agent. Through this step the column can, on the one hand, be decreased in its dimensions and on the other hand, the recycle can be correspondingly reduced so as to maintain a low return flow as required for a given degree of purity of the recovered water-free organic hydrogen peroxide solutions, the recycle can be correspondingly reduced. Recycle ratios of 0.15 and less (recycle:forerunings) are suitable in accordance with the invention.

It is also possible to work without the use of any return flow, i.e., recycle, namely in such cases when the uncontrolled flow resulting from the heat radiation in the column is sufficient for the desired fractionation effect.

The necessity to have a small recycle ratio by means of simultaneous use of a column having only few plates is less than urgent if there exists, between the selected organic solvent and the hydrogen peroxide, a large difference in boiling point. By suitable introduction of a heat exchanger and by maintaining definite wall temperatures it may be possible, depending on the particular separation problem, i.e., the boiling points of the components and the purity required, to dispense entirely with the subsequent column.

According to the described process water-free solutions of hydrogen peroxide in organic solvents containing up to the highest concentrations can be obtained. Because of the tendency to explosion there should however be manufactured solutions having at the highest a concentration of 15–18 weight percent of hydrogen peroxide. The evaporation of the hydrogen peroxide is carried out at a pressure of 5–60 torr.

The invention will appear more fully from examples which follow. These examples are given by way of illustration only and are not to be construed as limiting the invention in spirt or scope.

EXAMPLE 1

A working solution composed of 2-ethylanthraquinone, tetrahydroethylanthraquinone, diphenyloxide and tri-n-butylphosphate and containing 10 g./l. hydrogen peroxide was following preheating to 80° C. and 35 torr introduced into a glass thin layer evaporator heated to 155° C. There was blown in through one end of the evaporator superheated acetic acid-n-butylester having a temperature of 100° C. The vapors leaving the evaporator which had a temperature of 135° C. were cooled in a heat exchanger to 53° C. and then passed through a short column. A recycle ratio of 0.15 was established. The separated solution of hydrogen peroxide in n-butylacetate contained 12% hydrogen peroxide and was practically free of any working solution. 99.5% of the peroxide present in the working solution were thereby recovered.

EXAMPLE 2

A working solution corresponding to that used in Example 1 was treated with 667 g. cyclohexylacetate for each 10 litres of oxidized working solution and following prewarming to 80° C. at 15 torr introduced into a thin layer evaporator which was heated to 155° C. The vapors leaving the evaporator were introduced into a heat exchanger where they were cooled and thereafter passed through a short column. A recycle ratio of 1.0 was established. The separated solution of hydrogen peroxide in cyclohexylacetate thereby recovered contained 15% peroxide and was substantially free of any starting working solution. 99% of the hydrogen peroxide was recovered from the starting working solution.

We claim:

1. A process for preparing water-free hydrogen peroxide solutions from a working solution obtained in the preparation of hydrogen peroxide by the anthraquinone process which comprises passing the said working solution containing the peroxide simultaneously and in co-current or countercurrent with an organic chemically stable vaporized solvent, the boiling points of which are 30 to 180° C. at atmospheric pressure, through a thin layer film-forming evaporator and causing thereby the hydrogen peroxide to be desorbed by said solvent, condensing the vapors to form a desensitized solution of hydrogen peroxide in a single phase solution with said solvent, and finally recovering the hydrogen peroxide solution.

2. The process according to claim 1 wherein said solvent is a member selected from the group consisting of formic acid, acetic acid, propionic acid, n-butyric acid, i-butyric acid and fluoroacetic acid.

3. The process according to claim 1 wherein said solvent is a member selected from the group consisting of ethylacetate, propylacetate, butylacetate, amylacetate, cyclohexylacetate, n-hexylacetate, allylacetate and methylpropionate.

4. The process according to claim 1 wherein said solvent is a methyl-butyl ester of trimethylacetic acid.

5. The process according to claim 1 wherein said solvent is a member selected from the group consisting of butanol, hexanol and cyclohexanol.

6. The process according to claim 1 wherein said solvent is a member selected from the group consisting of acetone, methylethylketone, methylisobutylketone and cyclohexanone.

7. The process according to claim 1 wherein said solvent is a member selected from the group consisting of diethylether, diisopropylether, dibutylether, diisobutylether, di-sec. butylether, diamylether, diisoamylether, propylethylether, propylbutylether, dimethylether or methylethylether of ethylene and propylene glycol.

8. The process according to claim 1 wherein said solvent is used in admixture with at least one hydrocarbon and wherein said solvent other than said hydrocarbon is present in an amount of at least 20%.

9. The process of claim 1 which comprises preheating said hydrogen containing working solution prior to the introduction thereof into said film-forming evaporator.

10. The process of claim 1 which comprises subjecting the vapors from said film-forming evaporator to an at least partial condensation by cooling before recovering said solution.

11. The process of claim 1 wherein the vapors coming from the evaporator are passed through a stripping column to remove entrained working solution therefrom prior to condensing, and recovering said hydrogen peroxide solution.

12. The process of claim 1 wherein the vapors coming from the evaporator are first subjected to a partial condensation by cooling and then passed to a stripping column to remove entrained working solution prior to recovery of said hydrogen peroxide solution.

13. The process of claim 1 wherein the said organic solvent and working solution are passed through said evaporator at a pressure of 5 to 60 torr.

14. The process of claim 1 wherein said solvent is a compound having a boiling point at a temperature between 95 and 175° C. at atmospheric pressure.

References Cited

UNITED STATES PATENTS

| 2,305,248 | 12/1942 | Fleer et al. | 203—49 |
| 2,741,584 | 4/1956 | Holmes et al. | 159—16 R |
| 3,428,423 | 2/1969 | Egbert | 159—16 R |

FOREIGN PATENTS

| 769,514 | 3/1957 | Great Britain | 23—207 |

OSCAR R. VERTIZ, Primary Examiner

H. S. MILLER, Assistant Examiner

U.S. Cl. X.R.

423—590